(12) United States Patent  
Sato

(10) Patent No.: US 9,407,778 B2  
(45) Date of Patent: Aug. 2, 2016

(54) INFORMATION PROCESSING APPARATUS, METHOD, AND MEDIUM WITH TOUCH SCREEN OPERABILITY

(71) Applicant: CANON KABUSHIKI KAISHA, Tokyo (JP)

(72) Inventor: Masayuki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/364,642

(22) PCT Filed: Nov. 26, 2012

(86) PCT No.: PCT/JP2012/007554  
§ 371 (c)(1),  
(2) Date: Jun. 11, 2014

(87) PCT Pub. No.: WO2013/088651  
PCT Pub. Date: Jun. 20, 2013

(65) Prior Publication Data  
US 2014/0320926 A1  Oct. 30, 2014

(30) Foreign Application Priority Data

Dec. 13, 2011  (JP) .................................. 2011-272159

(51) Int. Cl.  
*H04N 1/00* (2006.01)  
*G06K 15/00* (2006.01)  
*B41J 29/00* (2006.01)  
*B41J 29/42* (2006.01)  
(Continued)

(52) U.S. Cl.  
CPC ............. *H04N 1/00381* (2013.01); *B41J 29/00* (2013.01); *B41J 29/42* (2013.01); *G03G 15/502* (2013.01); *G03G 21/00* (2013.01); *G06F 3/048* (2013.01); *G06F 3/0488* (2013.01); *G06K 15/005* (2013.01); *H04N 1/00* (2013.01); *H04N 1/00392* (2013.01); *H04N 1/00411* (2013.01); *H04N 1/00424* (2013.01); *H04N 1/00474* (2013.01); *H04N 1/00482* (2013.01); *H04N 1/2338* (2013.01); *H04N 2201/0081* (2013.01); *H04N 2201/0082* (2013.01); *H04N 2201/0089* (2013.01)

(58) Field of Classification Search  
CPC .................. H04N 1/00411; H04N 2201/0094; H04N 1/00474; G06F 3/0488; G06F 3/04883; G06F 3/0485; G06F 3/017; G06F 3/03547; G06F 3/04845  
See application file for complete search history.

(56) References Cited

U.S. PATENT DOCUMENTS 6,313,853 B1 * 11/2001 Lamontagne et al. ........ 715/762  
2008/0112005 A1 * 5/2008 Murray et al. ............... 358/1.15  
(Continued)

FOREIGN PATENT DOCUMENTS

EP  2391124 A1  11/2011  
JP  3-042713 A  2/1991  
(Continued)

*Primary Examiner* — Thomas D Lee  
(74) *Attorney, Agent, or Firm* — Canon USA Inc. IP Division

(57) ABSTRACT

An information processing apparatus provided with a touch panel includes a display unit configured to display document data, and an instruction unit configured to instruct a print apparatus to perform a print processing of the document data in response to a situation in which the document data displayed on the display unit is touched and flicked in a particular direction.

16 Claims, 13 Drawing Sheets

(51) Int. Cl.
  *G03G 15/00*  (2006.01)
  *G06F 3/0488*  (2013.01)
  *G03G 21/00*  (2006.01)
  *G06F 3/048*  (2013.01)
  *H04N 1/23*  (2006.01)

(56) References Cited

U.S. PATENT DOCUMENTS

| | | |
|---|---|---|
| 2009/0172593 A1 | 7/2009 | Geurts et al. |
| 2010/0058252 A1* | 3/2010 | Ko .................. 715/863 |
| 2012/0206766 A1* | 8/2012 | Suzuki .............. 358/1.15 |
| 2013/0016121 A1* | 1/2013 | Azuchi .............. 345/619 |

FOREIGN PATENT DOCUMENTS

| | | |
|---|---|---|
| JP | 8-95737 A | 4/1996 |
| JP | 2001-67201 A | 3/2001 |
| JP | 2005-028729 A | 2/2005 |
| JP | 2008060834 A | 3/2008 |
| JP | 2008-260185 A | 10/2008 |
| JP | 2011-209822 A | 10/2011 |

* cited by examiner

FIG. 11

| GESTURE TYPE | DIRECTION | PROCESSING CONTENT |
|---|---|---|
| FLICK | LEFT | PRINT |
| FLICK | RIGHT | DELETE |
| FLICK | DOWN | SAVE |
| FLICK | UP | SEND |

INFORMATION PROCESSING APPARATUS, METHOD, AND MEDIUM WITH TOUCH SCREEN OPERABILITY

CROSS REFERENCE TO RELATED APPLICATIONS

This application is a National Stage filing of International Application No. PCT/JP2012/007554 filed Nov. 26, 2012, which claims the benefit of priority from Japanese Patent Application No. 2011-272159 filed Dec. 13, 2011, the disclosures of each of which are hereby incorporated by reference herein in their entirety.

TECHNICAL FIELD

The present invention relates to an information processing apparatus provided with a touch panel, a control method for the information processing apparatus, and a program.

BACKGROUND ART

Up to now, an image forming apparatus including a scanner and a printer is generally provided with an operation panel integrated to a main body of the image forming apparatus. On the other hand, an image forming apparatus provided with an operation unit that is detachably attachable to the main body is also conceivable (for example, see PTL 1). In the above-described image forming apparatus, in a case where the main body is provided with a scanner unit and a printer unit, the operation panel can be detached from the operation panel, and it is also possible to conduct an operation instruction in front of the scanner unit and the printer unit.

Also, in recent years, in a computer device provided with a touch panel and various sensors, various gesture inputs can be conducted by using the touch panel, and it is possible to detect a position, an inclination, a direction, and the like of the device by using the various sensors.

In the above-described image forming apparatus to which the operation panel can be detachably attached, an operator can detach the operation panel from the main body and conduct various settings while taking along the operation panel. However, this structure only enables the detachment of the operation panel from the main body for the operation, and a problem exists that an operability is to be further improved by making use of a characteristic corresponding to a portability of the operation panel.

In addition, in the computer device provided with the touch panel and the various sensors, irrespective of the provision of the touch panel and the various sensors, a manner for a print instruction to a printer is not different from a print instruction method employed in a computer device that is not provided with the touch panel and the various sensors.

CITATION LIST

Patent Literature

PTL 1: Japanese Patent Laid-Open No. 2001-67201

SUMMARY OF INVENTION

The present invention has been made to solve these problems, and the present invention aims at further improving an operability in a print instruction to a print apparatus from an information processing apparatus provided with at least a touch panel.

The present invention provides an information processing apparatus provided with a touch panel includes: a display unit configured to display document data; and an instruction unit configured to instruct a print apparatus to perform a print processing of the document data in response to a situation in which the document data displayed on the display unit is touched and flicked in a particular direction.

Further features of the present invention will become apparent from the following description of exemplary embodiments with reference to the attached drawings.

BRIEF DESCRIPTION OF DRAWINGS

FIG. 11 illustrates a table indicating a correspondence relationship between gesture operation guides and processings corresponding to the respective displays according to the present exemplary embodiment.

DESCRIPTION OF EMBODIMENTS

Hereinafter, exemplary embodiments of the present invention will be described in detail with reference to the accompanying drawings. It is noted that the following exemplary embodiments are not intended to limit the present invention related to the scope of the claims, and also all of combinations of characteristics described according to the present exemplary embodiment may not be indispensable to a solution for the problem of the present invention. It is noted that according to the present exemplary embodiment, an operation panel will be described as an embodiment of an information processing apparatus, for example, but the present invention is not limited to the operation panel.

Figure 1:
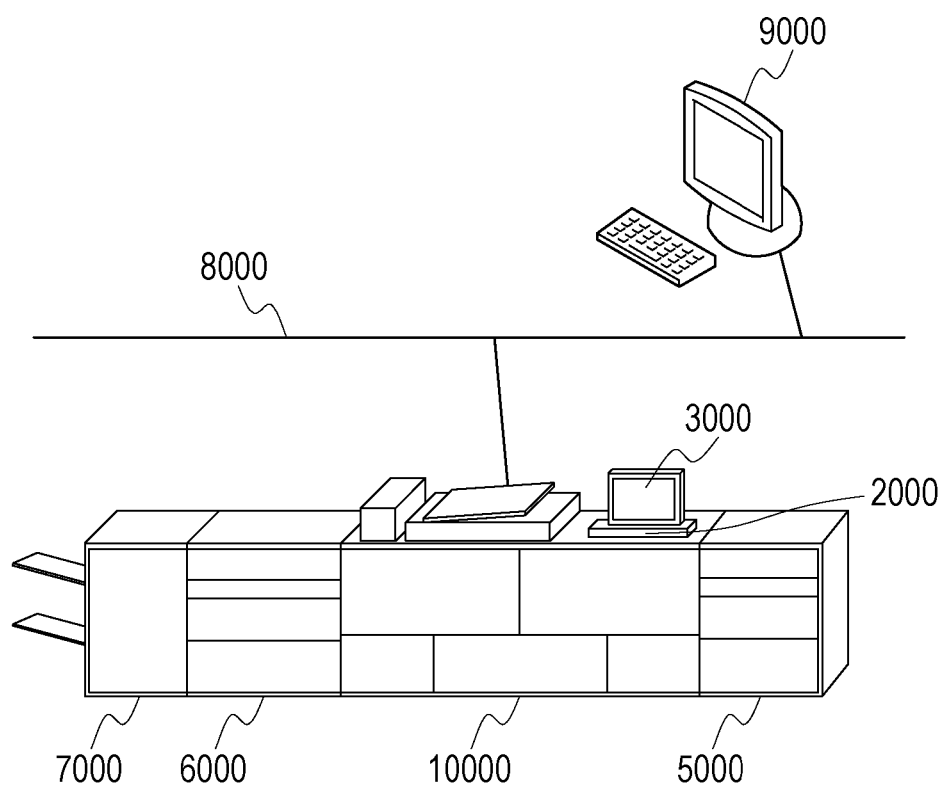
FIG. 1 is a schematic diagram of a use environment of an image forming apparatus according to an exemplary embodiment of the present invention.

FIG. 1 is a schematic diagram of a use environment of an image forming apparatus according to an exemplary embodiment of the present invention.

This image forming apparatus can cope with a range of print and binding requests and the like by combining various options with which saddle stitching binding, cutting, folding process, and the like can be carried out by a so-called print on demand (POD) device that is provided with a print apparatus.

FIG. 1 illustrates an example of the image forming apparatus in which a sheet deck 5000, a binder 6000, and a finisher 7000 are combined with respect to an image forming apparatus main body 10000. The main body 10000 is connected to a personal computer (PC) 9000 via a LAN 8000. The personal computer 9000 creates and edits respective pages of document data and generates print jobs including settings such as binding, cutting, and folding process. The thus generated print jobs are sent to the image forming apparatus main body 10000 via the LAN 8000 for printing. It is noted that according to the present exemplary embodiment, the document data means not only text data but also data including image data such as photographs and graphic representations.

Also, in FIG. 1, a detachably attachable operation panel 3000 that is a characteristic of the present exemplary embodiment is attached to a home position 2000 that is mounted on the main body 10000. The detachably attachable operation panel 3000 includes a display unit 3200 (FIG. 2) and a built-in battery 3211 (FIG. 2) so as to enable the operation even in a state of being detached from the main body 10000. When the operation panel 3000 is attached to the home position 2000, the battery is charged by electric power supplied from the home position 2000.

It is noted that since the options such as the sheet deck 5000, the binder 6000, and the finisher 7000 are not directly related to the present invention, a detailed description thereof will be omitted.

Figure 2:
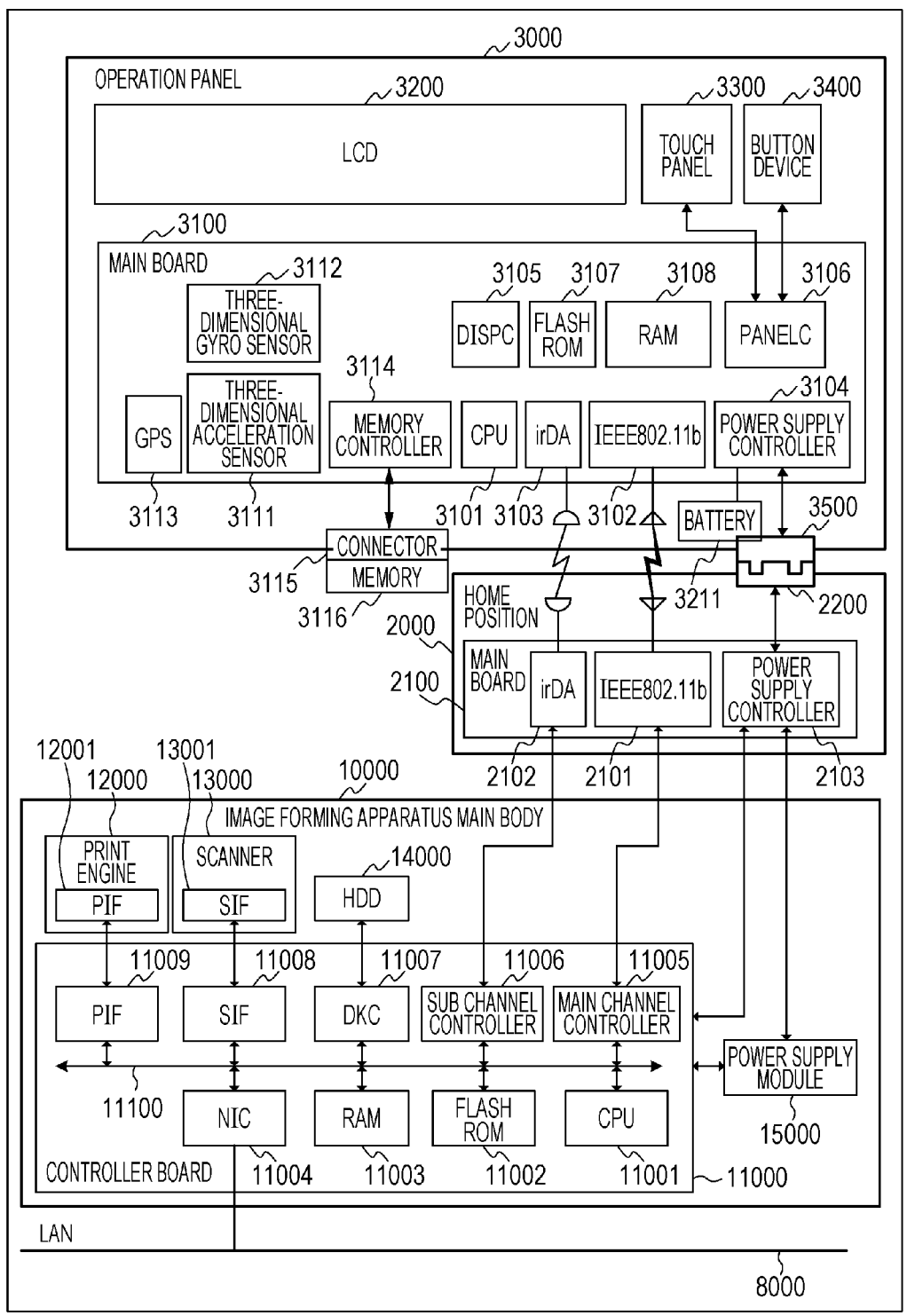
FIG. 2 is a block diagram of hardware configurations of an image forming apparatus main body, a home position, and an operation panel according to the present exemplary embodiment.

FIG. 2 is a block diagram of hardware configurations of the image forming apparatus main body 10000, the home position 2000, and the operation panel 3000 according to the present exemplary embodiment. Hereinafter, the respective configurations of the main body 10000, the home position 2000, and the operation panel 3000 will be described. First, the main body 10000 will be described.

As illustrated in FIG. 2, the main body 10000 includes a controller board 11000, a print engine 12000, a scanner 13000, a hard disk drive (HDD) 14000, and a power supply module 15000. Then, the respective units are operated by electric power supplied from the power supply module 15000.

The controller board 11000 includes a CPU 11001, a flash ROM 11002, a RAM 11003, a network interface card (NIC) 11004, a main channel controller 11005, and a sub channel controller 11006. Furthermore, the controller board 11000 includes a disk controller (DKC) 11007, a scanner interface (SIF) 11008, and a printer interface (PIF) 11009. Each of these devices 11001 to 11009 is connected to the CPU 11001 via a bus 11100.

The CPU 11001 is a processor configured to control the respective devices connected to the bus 11100 in an overall manner and also execute control programs stored in the flash ROM 11002 and the HDD 14000. The RAM 11003 is used as a main memory and a work area of the CPU 11001. The NIC 11004 bi-directionally exchanges data with the personal computer 9000 and another image forming apparatus via the LAN 8000. The HDD 14000 is accessed via the DKC 11007. The HDD 14000 stores control programs and also is used as a temporary storage area of image data.

The scanner 13000 is provided with a reading sensor, an original conveyance mechanism, and the like (which are not illustrated in the drawing). The reading sensor, the original conveyance mechanism, and the like are controlled while following software that is executed by the CPU 11001 via the SIF 11008 mounted to the controller board 11000 and an SIF 13001 mounted to the scanner 13000. As a result, an original is read by the reading sensor, and the obtained data is transferred to the controller board 11000 via the SIF 13001 and the SIF 11008.

Also, the print engine 12000 is provided with a recording unit of an electrophotographic system, a recording sheet cassette, a sheet conveyance unit, and the like (all of which are not illustrated in the drawing). A print request based on the print job is sent from the controller board 11000 via the PIF 11009 and a PIF 12001 mounted to the print engine 12000. The recording unit, the sheet conveyance unit, and the like are similarly controlled on the basis of the program executed by the CPU 11001 via the PIF 11009 and the PIF 12001. As a result, an image in accordance with the print request is formed on a sheet.

The main channel controller 11005 and the sub channel controller 11006 are used when exchange is conducted between the main body 10000 and the detachably attachable operation panel 3000. A detail will be described below.

Next, the home position 2000 will be described.

As illustrated in FIG. 2, the home position 2000 is mainly provided with a main board 2100 and a connector 2200. The main board 2100 is mainly provided with an IEEE802.11b module 2101, an irDA module 2102, and a power supply controller 2103. The IEEE802.11b module 2101 is connected to the main channel controller 11005 of the controller board 11000 and mediates a wireless communication with the operation panel 3000 on the basis of the request from the controller board 11000. Also, the irDA module 2102 is connected to the sub channel controller 11006 of the controller board 11000 and mediates an infrared communication with the operation panel 3000 on the basis of the request from the controller board 11000. The power supply controller 2103 is connected to the power supply module 15000. The IEEE802.11b module 2101 and the irDA module 2102 receive the electric power supply via the power supply controller 2103. Also, the power supply controller 2103 is connected to the connector 2200 and supplies the electric power to the operation panel 3000 as well when a connector 3500 of the operation panel 3000 is in a contact state. In addition, the power supply controller 2103 monitors a supply state of the electric power and detects whether or not the operation panel 3000 is attached to the home position 2000 to send the detection result to the controller board 11000.

Next, the operation panel 3000 will be described.

The detachably attachable operation panel 3000 is mainly provided with a main board 3100, the display unit (LCD) 3200, a touch panel 3300, a button device 3400, and the connector 3500. The main board 3100 includes a CPU 3101, an IEEE802.11b module 3102, an irDA module 3103, and a power supply controller 3104. Furthermore, the main board 3100 includes a display controller (DISPC) 3105, a panel controller (PANELC) 3106, a flash ROM 3107, and a RAM 3108. The respective modules 3101 to 3108 are connected via a bus (not illustrated) similarly as in the controller board 11000.

The CPU 3101 is a processor configured to control the respective devices connected to the bus in an overall manner and also execute control programs stored in the flash ROM 3107. The RAM 3108 functions as a main memory and a work area of the CPU 3101 and a storage area for video data that is displayed on the LCD 3200. The CPU 3101 can recognize an orientation and a movement of the operation panel 3000 by using a three-dimensional acceleration sensor 3111 and a three-dimensional gyro sensor 3112. The three-dimensional acceleration sensor 3111 includes a movable part in a semiconductor chip. A fin at the movable part moves on the basis of an externally applied acceleration, and an interval with a fin at an immovable part changes, so that a capacitance changes. According to this, it is possible to detect the acceleration externally applied on the operation panel 3000. Also, the three-dimensional gyro sensor 3112 is a semiconductor element of a system utilizing Coriolis force. By applying a signal processing on outputs of these two sensors 3111 and 3112 by taking a gravitational effect into account, for example, it is possible to detect whether the operation panel 3000 is in an elevated state or a planar state and is a vertically placed or horizontally placed and further detect a three-dimensional movement in backward and forward, left and right, and up and down directions and a position at a high accuracy.

It is noted that a piezo-resistance type, a thermal detection type, and the like are also proposed for the three-dimensional acceleration sensor 3111, and the present invention can be carried out by using all the proposed systems.

Furthermore, the CPU 3101 can recognize a current position of the operation panel 3000 by using a GPS 3113. The GPS indicates a positioning system utilizing Global Positioning System. A technology for detecting a direction and an orientation of the apparatus by using these various sensors is already proposed, and all the technologies can be mounted to the operation panel 3000 according to the exemplary embodiments of the present invention, so that a further detailed description will be omitted. That is, any type and mechanism of the sensor may be employed so long as the sensor can detect the above-described three-dimensional movement, the position, the orientation, and the like of the operation panel 3000.

The display controller (DISPC) 3105 transfers the video data expanded onto the RAM 3108 to the LCD 3200 in accordance with the request of the CPU 3101 and also controls the LCD 3200 to display the video data. The panel controller (PANELC) 3106 controls the touch panel 3300 and the button device 3400 in accordance with the request of the CPU 3101. By way of the control, a press position on the touch panel 3300, a key code corresponding to a pressed button on the button device 3400, and the like are returned to the CPU 3101. A memory controller 3114 accesses an external memory 3116 such as an SD memory via a connector 3115 for an external memory on the basis of the control by the CPU 3101 and can read out the data of the external memory 3116. The thus read data can be displayed on the LCD 3200 via the DISPC 3105. Also, it is possible to perform the transmission and reception of the data with the main body 10000 via the CPU 3101 and the IEEE802.11b module 3102.

The power supply controller 3104 is connected to the connector 3500, and when the connector 2200 of the home position 2000 is in a connected state with the connector 3500, the supply of the electric power is received from the power supply module 15000 of the main body 10000. According to this, while the battery 3211 connected to the power supply controller 3104 is changed, the electric power is also supplied to the entire operation panel 3000. If the electric power is not supplied from the power supply module 15000, the electric power from the battery 3211 is supplied to the entire operation panel 3000.

The IEEE802.11b module 3102 establishes a wireless communication with the IEEE802.11b module 2101 on the home position 2000 on the basis of the control by the CPU 3101 and mediates a communication with the main body 10000. The irDA module 3103 establishes an infrared communication with the irDA module 2102 on the home position 2000 on the basis of the control by the CPU 3101 and mediates a communication with the main body 10000.

Next, a wireless communication as a main channel according to the present exemplary embodiment will be described.

With some reference to the description of FIG. 2, according to the present exemplary embodiment, the wireless communication as the main channel is carried out in conformity to the standard of IEEE802.11b that is a already proposed technology. To describe further, in the system according to the present exemplary embodiment, the wireless communication is carried out in an infrastructure mode where the main body 10000 is set as an access point (AP) and the operation panel 3000 is set as a terminal.

As described above, the system according to the present exemplary embodiment is a system where the main body 10000 can establish the wireless communication with the operation panel 3000.

Next, an operation of the operation panel 3000 according to the present exemplary embodiment will be described with reference to a flow chart of FIG. 3. The operation panel 3000 has two modes including a "browse mode" (first operation mode) and a "transfer mode" (second operation mode). The "browse mode" is a mode for browsing the document data on the operation panel 3000, and the "transfer mode" is a mode in which the document data can be sent from the operation panel 3000 to the main body 10000.

Figure 3:
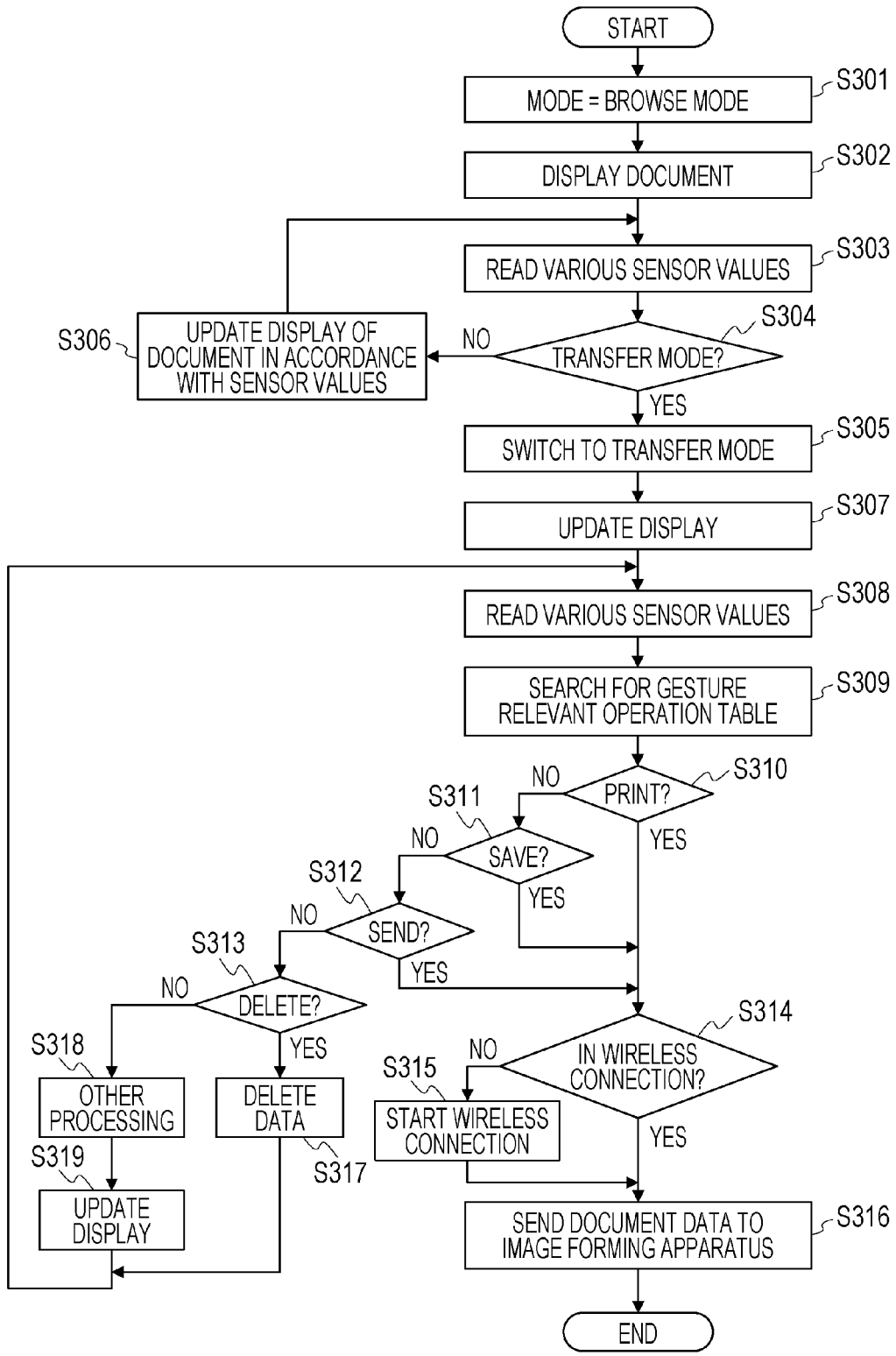
FIG. 3 is a flow chart for describing an operation by an operation panel according to the present exemplary embodiment.

FIG. 3 is a flow chart for describing the operation of the operation panel 3000 according to the present exemplary embodiment. A program for executing this processing is stored in the flash ROM 3107, and respective steps of the flow chart are executed under the control of the CPU 3101. It is noted that the operation panel 3000 according to the present exemplary embodiment can perform creation, obtainment, and the like of the document data by the operation panel 3000 by executing programs such as a document creation application and a browse software.

This processing is started when a power supply of the operation panel 3000 is turned on. First, in S301, an activation is realized in the "browse mode". Next, the flow proceeds to S302. The operation panel 3000 asks an operator to select displayable document data and displays the selected document data on the LCD 3200. The document data displayed herein includes document data created by using document creation software and document data on a Web page that is stored in the external memory 3116. These pieces of document data are displayed on the operation panel 3000 by using the browse software. At this time, the document data displayed on the LCD 3200 preferably resembles output dimensions at a time when the document data is actually subjected to a print processing.

Next, the flow proceeds to S303. The CPU 3101 reads the outputs of the touch panel 3300, the button device 3400, the three-dimensional acceleration sensor 3111, and the three-dimensional gyro sensor 3112 which are provided to its own apparatus. A part of sensor values read here is stored in the RAM 3108. This is because instead of only using a single value that is output from the sensor, a displacement of the value is utilized. Next, the flow proceeds to S304. The CPU 3101 determines whether or not the mode of the operation panel 3000 is shifted to the "transfer mode" on the basis of the value read in S303. A specific determination method in S304 will be described below. When it is determined that the mode is not shifted to the "transfer mode", in S306, and the operation panel 3000 updates the display of the document data displayed on the LCD 3200 while following the output values of the various sensors which are read in S303. After that, the flow returns to S303, and the above-described processing is repeatedly conducted.

Here, an update method for the display of the document data in the case of the "browse mode" in S306 will be described by using the drawing.

In a case where the displayed document data is selected for the first time, the operation panel 3000 performs a rasterizing processing on the selected document data and displays a document image equivalent to a first page of the document data on the LCD 3200 in accordance with the orientation of the operation panel 3000 (vertical or horizontal).

Figure 4:
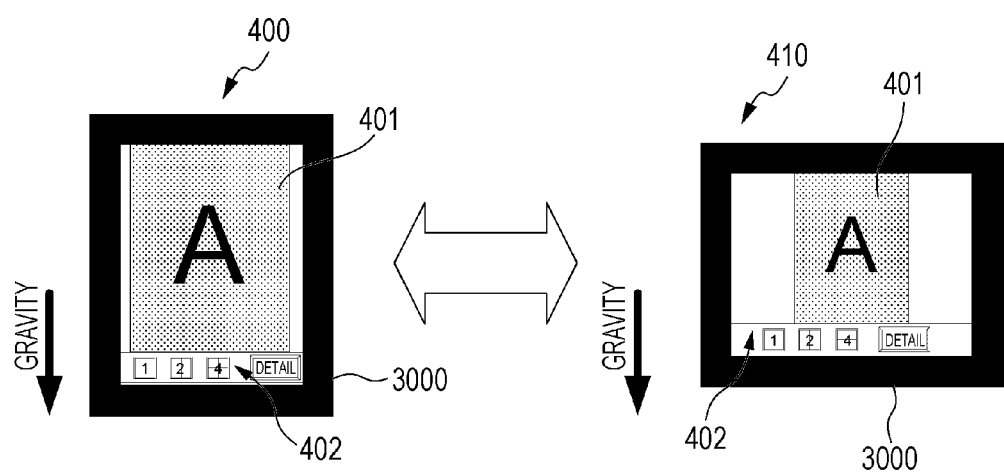
FIG. 4 illustrates a display example of the operation panel according to the present exemplary embodiment.

FIG. 4 is an explanatory diagram for describing the orientation of the operation panel 3000 and a display mode thereof.

A state 400 indicates a display state in a case where the orientation of the operation panel 3000 is vertical (portrait). On the other hand, a state 410 indicates a display state in a case where the orientation of the operation panel 3000 is horizontal (landscape). Image data 401 is displayed, and a button group 402 is used for changing print settings such as a layout.

The orientation of the operation panel 3000 is detected by the three-dimensional gyro sensor 3112 and the three-dimensional acceleration sensor 3111. Also, when the operation panel 3000 is rotated to be changed from vertical to horizontal or from horizontal to vertical, the display mode is changed from the state 400 of FIG. 4 to the state 410 or from the state 410 to the state 400.

In addition, the operation panel 3000 can also switch a page of the document data displayed on the LCD 3200 on the basis f an input from a user to the touch panel 3300.

Figure 5:
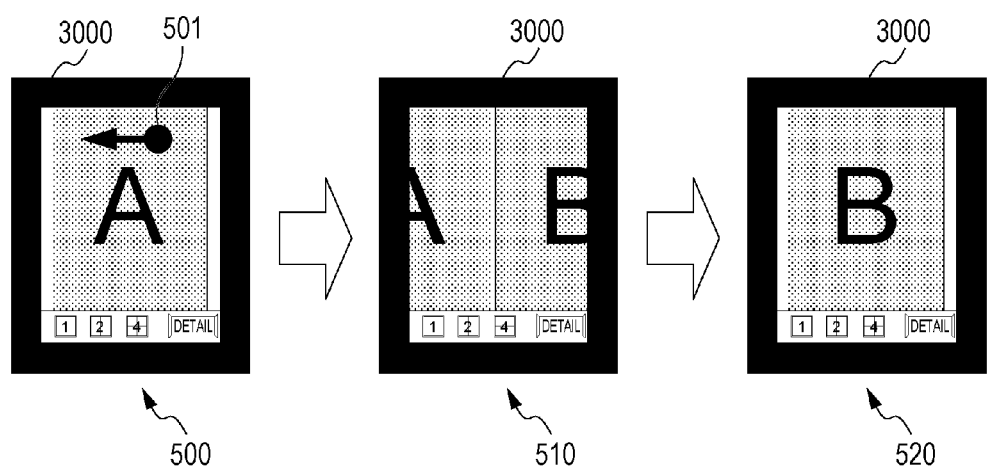
FIG. 5 illustrates a display example of the operation panel according to the present exemplary embodiment.

FIG. 5 is an explanatory diagram for describing a display mode at a time of a page switching in a case where the operation panel 3000 is vertically set.

As in the state 400 of FIG. 4, a state 500 indicates a display state in a case where the operation panel 3000 is vertical. As indicated herein by a state 501, when the user operates the touch panel 3300 with a finger, in associated with the operation, the operation panel 3000 updates (scrolls) the display so that a displayed page (which is represented by "A") is moved to a left side of the screen. It is noted that a mark 501 herein represents a state in which the user flicks the screen with the finger in a left direction. That is, the mark 501 represents a flick operation by the user towards the left direction. Subsequently, the display is updated so that a next page (which is represented by "B") is moved from a right side of the screen. It is noted that according to the present exemplary embodiment, as illustrated by the mark 501 of FIG. 5, the next page is displayed when the flick operation is conducted towards the left direction, and on reversely, when the previous page is displayed the flick operation is conducted towards the right direction. When a first page is displayed, in a case where an input of a display instruction of a page out of the document data is input such as the flick operation conducted towards the right direction, the display of the page that is displayed at that time is maintained. It is noted that for the operation for scrolling the screen, in addition to the flick, a drag operation in which the finger is moved in a state of being in contact with the touch panel, and the finger is released directly above after the movement and other operations may also be employed. A state 520 indicates a state in which the display of the next page (which is represented by "B") is completed.

In addition, through various input instructions to the touch panel 3300, for example, the operation panel 3000 can change the display system such as an enlargement and a reduction of the displayed image. For example, the enlargement of the image can be instructed through a pinch-out operation (in which a distance between two fingers on the touch panel is increased), and the reduction of the image can be instructed through a pinch-in operation (in which the distance between the two fingers on the touch panel is decreased).

Figure 6:
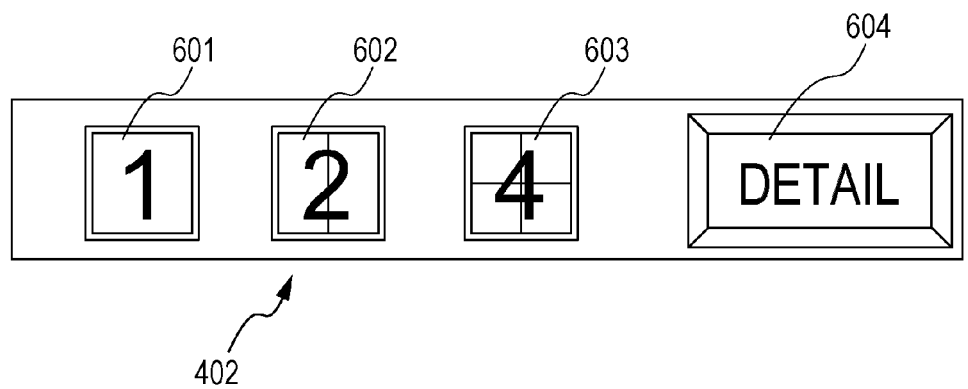
FIG. 6 illustrates a button group displayed on the operation panel according to the present exemplary embodiment.

FIG. 6 is an enlarged view of the button group 402.

A button 601 is used for instructing a print of one page of the document data on a single space. A button 602 is used for instructing an arrangement of two pages of the document data on the single space to be printed (2 in 1 layout). A button 603 is used for instructing an arrangement of four pages of the document data on the single space to be printed (4 in 1 layout). A button 604 is used for displaying a setting screen for carrying out a further detailed print setting (for example, a specification of the number of copies and the like).

Figure 7A:
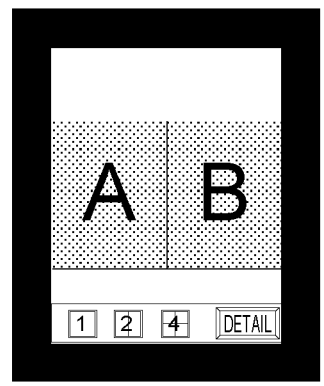
FIG. 7A illustrates a display example of the operation panel according to the present exemplary embodiment.
Figure 7B:
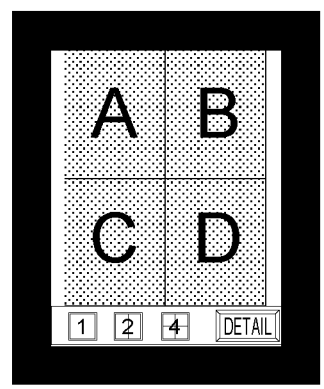
FIG. 7B illustrates a display example of the operation panel according to the present exemplary embodiment.

The screen displayed on the LCD 3200 is changed in accordance with inputs of the buttons 601 to 603. For example, when the button 602 is pressed, as illustrated in FIG. 7A, the two pages are laid out to be displayed on the single space. Also, when the button 603 is pressed, as illustrated in FIG. 7B, the four pages are laid out to be displayed on the single space. By using the buttons on the screen in this manner, it is possible to specify the number of pages displayed on the single screen.

FIGS. 7A and 7B are explanatory diagrams for describing a display control example for plural pages in a case where the operation panel 3000 is vertical.

It is noted that in the following description, even in a case where the plural pages of the document data are laid out on the single space, the single space is described as one page. That is, in a case where the two pages of the document data are laid out on the single space, the first page indicates a first space page where the first and second pages of the document data are laid out. Then, the second page indicates a second space page where the third and fourth pages of the document data are laid out. According to the present exemplary embodiment, the operation panel 3000 creates the print job so that the result printed by the main body 10000 becomes the same as the dimensions displayed on the operation panel 3000.

FIG. 3 will be described again. In S304, in a case where it is determined that the mode of the operation panel 3000 is changed to the "transfer mode", in S305, the mode of the operation panel 3000 is switched to the "transfer mode". When the mode is switched to the "transfer mode", a content displayed on the LCD 3200 and a behavior of the operation panel 3000 with respect to the read values of the touch panel 3300, the button device 3400, the three-dimensional acceleration sensor 3111, and the three-dimensional gyro sensor 3112 are changed. It is noted that when the mode is switched, the values of the various sensors which are stored in the RAM 3108 are cleared. Also, the image displayed when the mode is switched to the "transfer mode" is a start page or an end page of the page extent of the print target.

Figure 8:
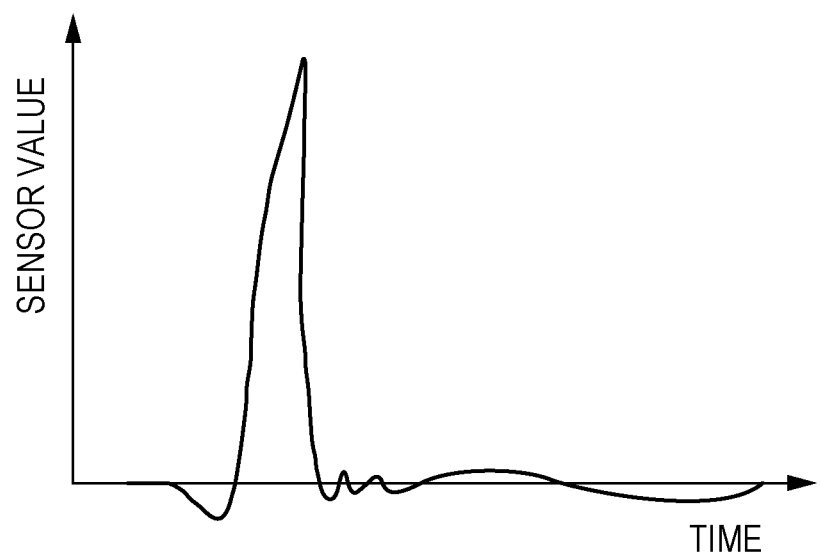
FIG. 8 illustrates an example of a detection value of a three-dimensional acceleration sensor according to the present exemplary embodiment.
Figure 9:
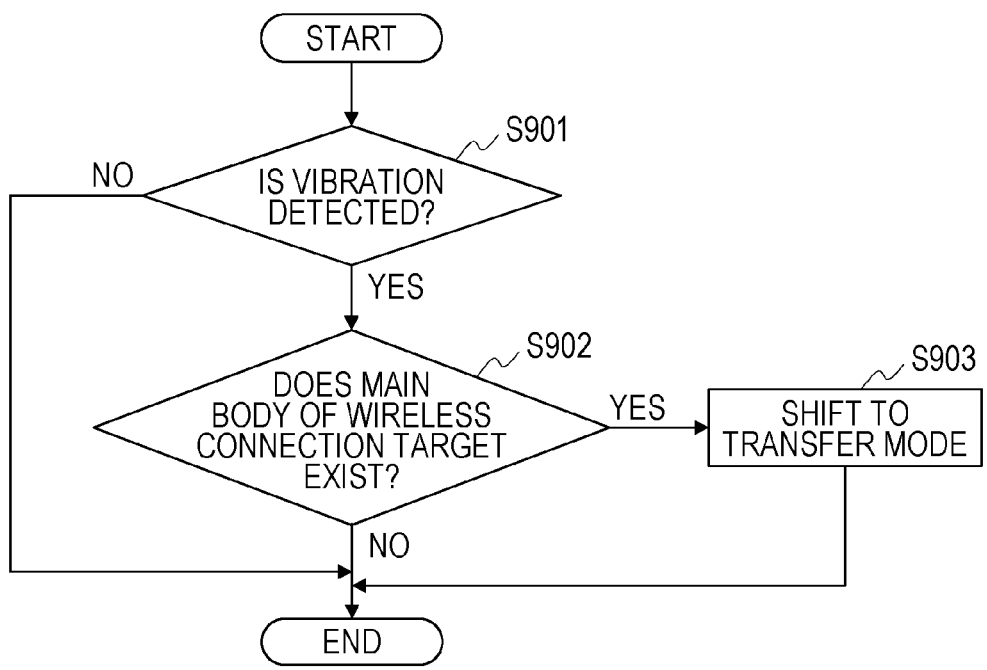
FIG. 9 is a flow chart for describing the operation by the operation panel according to the present exemplary embodiment.

Here, by using FIGS. 8 and 9, the determination method as to whether or not the mode is shifted from the "browse mode" to the "transfer mode" in S304 will be specifically described.

According to the present exemplary embodiment, by conducting an operation with which a detection value of the three-dimensional acceleration sensor 3111 in the vicinity of the main body 10000 becomes higher than or equal to a predetermined value, the mode of the operation panel 3000 is shifted from the "browse mode" to the "transfer mode". For example, the mode of the operation panel 3000 is shifted to the "transfer mode" by conducting an operation of causing the operation panel 3000 to lightly collide with a part of the main body 10000, an operation of shaking the operation panel 3000 in the vicinity of the main body 10000, or the like. In this case, the three-dimensional acceleration sensor 3111 functions as a collision detection unit or a vibration detection unit.

FIG. 8 illustrates an example of a detection value of the three-dimensional acceleration sensor 3111 provided to the operation panel 3000, for example, at a time when the operation panel 3000 lightly collides with the main body 10000.

According to this, it is possible to detect that the operation panel 3000 collides with some object. However, if the detection value of the three-dimensional acceleration sensor 3111 alone is used, it is difficult to determine whether the collided target is the main body 10000 or some object other than the main body. In view of the above, according to the present exemplary embodiment, after the operation panel 3000 detects the collision, by checking whether an ad-hoc wireless connection target exists and conducting a wireless connection to negotiate to check if this is the main body 10000, it is determined whether the main body 10000 collides with the operation panel 3000.

FIG. 9 is a flow chart for describing a processing executed by the operation panel 3000 while following the detection value of the three-dimensional acceleration sensor 3111. A program for executing this processing is stored in the flash ROM 3107, and respective steps are executed under the control of the CPU 3101.

First, in S901, the CPU 3101 determines whether or not an impact or a vibration caused by the above-described collision or the like is applied on the operation panel 3000 on the basis of the detection value of the three-dimensional acceleration sensor 3111. When it is determined that the impact or the vibration is applied, S902, and the CPU 3101 determines whether or not the main body 10000 of the wireless connection target is in the vicinity of the operation panel 3000. The determination can be made by comparing the position detected by the GPS 3113 with a position of the main body 10000 (which is previously registered) and checking whether or not a distance therebetween is lower than or equal to a predetermined value. Subsequently, when it is determined that the main body 10000 of the wireless connection target is located in the vicinity of the operation panel 3000, the flow proceeds to S903, and the mode is shifted to the "transfer mode".

It is noted that in addition to the above-described method, various methods of determining whether or not the operation panel 3000 is located in the vicinity of the main body 10000 are conceivable. For example, by way of a vicinal wireless communication utilizing the irDA 3103 provided to the operation panel 3000 and the irDA 2102 provided to the home position 2000 of the main body 10000, it may be determined whether or not the operation panel 3000 is in the vicinity of the main body 10000. It is noted that in a case where the determination utilizing the vicinal wireless communication is conducted, the distance between the operation panel 3000 and the main body 10000 is limited in a range where the vicinal wireless communication can be carried out.

FIG. 3 will be described again. In S305, when the switching to the "transfer mode" is ended, after that, the flow progresses to S307.

In S307, the CPU 3101 displays a gesture operation guide screen on the LCD 3200.

Figure 10:
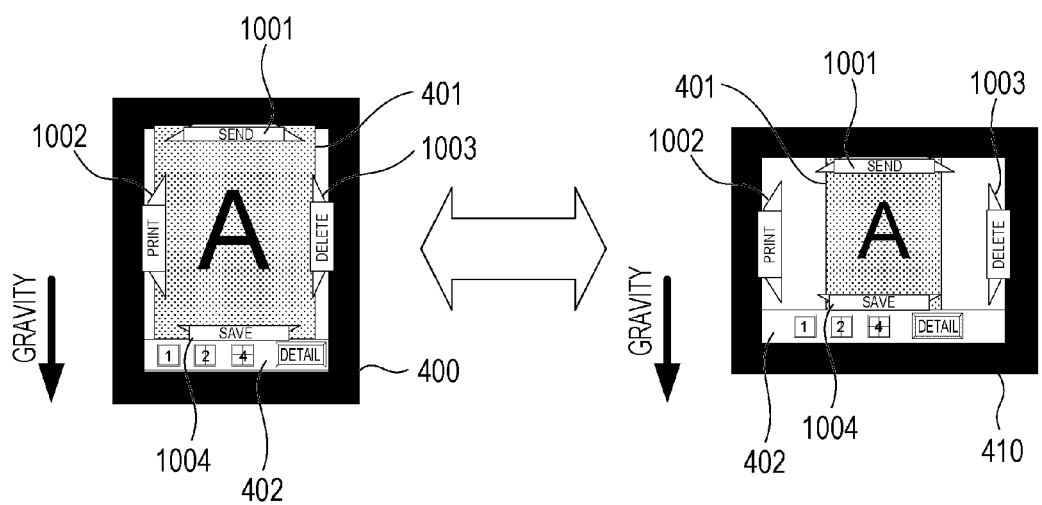
FIG. 10 illustrates a display example of the operation panel according to the present exemplary embodiment.

FIG. 10 illustrates an example of the gesture operation guide screen displayed on the operation panel 3000. In FIG. 10, the same reference signs are assigned to the same components corresponding to the operation panel described in FIG. 4.

An illustration 400 represents a case in which the operation panel 3000 is set to be vertical. On the other hand, an illustration 410 represents a case in which the operation panel is set to be horizontal. An image 401 corresponds to the image data of the operation target, and gesture operation guides 1001, 1002, 1003, and 1004 are displayed. A display position corresponding to the operation guide of this guide, that is, whether the display is made at an upper part, a lower part, a left part, or a right part does not depend on an orientation of the operation panel (vertical or horizontal), and the display is made at the same position. Display contents of the respective guides are previously defined by a table illustrated in FIG. 11, and processing contents corresponding to the respective relevant positions are displayed.

FIG. 11 illustrates a table indicating a correspondence relationship between gesture operation guides displayed on the LCD 3200 of the operation panel 3000 and processings corresponding to the respective displays in the "transfer mode". This table is stored in advance in the flash ROM 3107 of the operation panel 3000 (or another storage unit of the operation panel 3000). In this table, a gesture type 1101, a direction 1102, and a content processing 1103 are mutually associated. In the example of FIG. 11, the gesture type all corresponds to the flick operation. Then, in accordance with the direction of the flick operation, the respective processings to be executed are allocated. In reference to the table of FIG. 11, on the touch panel of the operation panel 3000, in a case where the flick operation is conducted in the left direction with respect to the user facing the operation panel 3000, the CPU 3101 determines that a print processing is instructed. Similarly, in a case where the flick operation is conducted towards the right direction, the CPU 3101 determines that the deletion processing is instructed. In a case where the flick operation is conducted in the down direction, the CPU 3101 determines that a save processing is instructed. In a case where the flick operation is conducted in the up direction, the CPU 3101 determines that a transmission processing is instructed.

Figure 12:
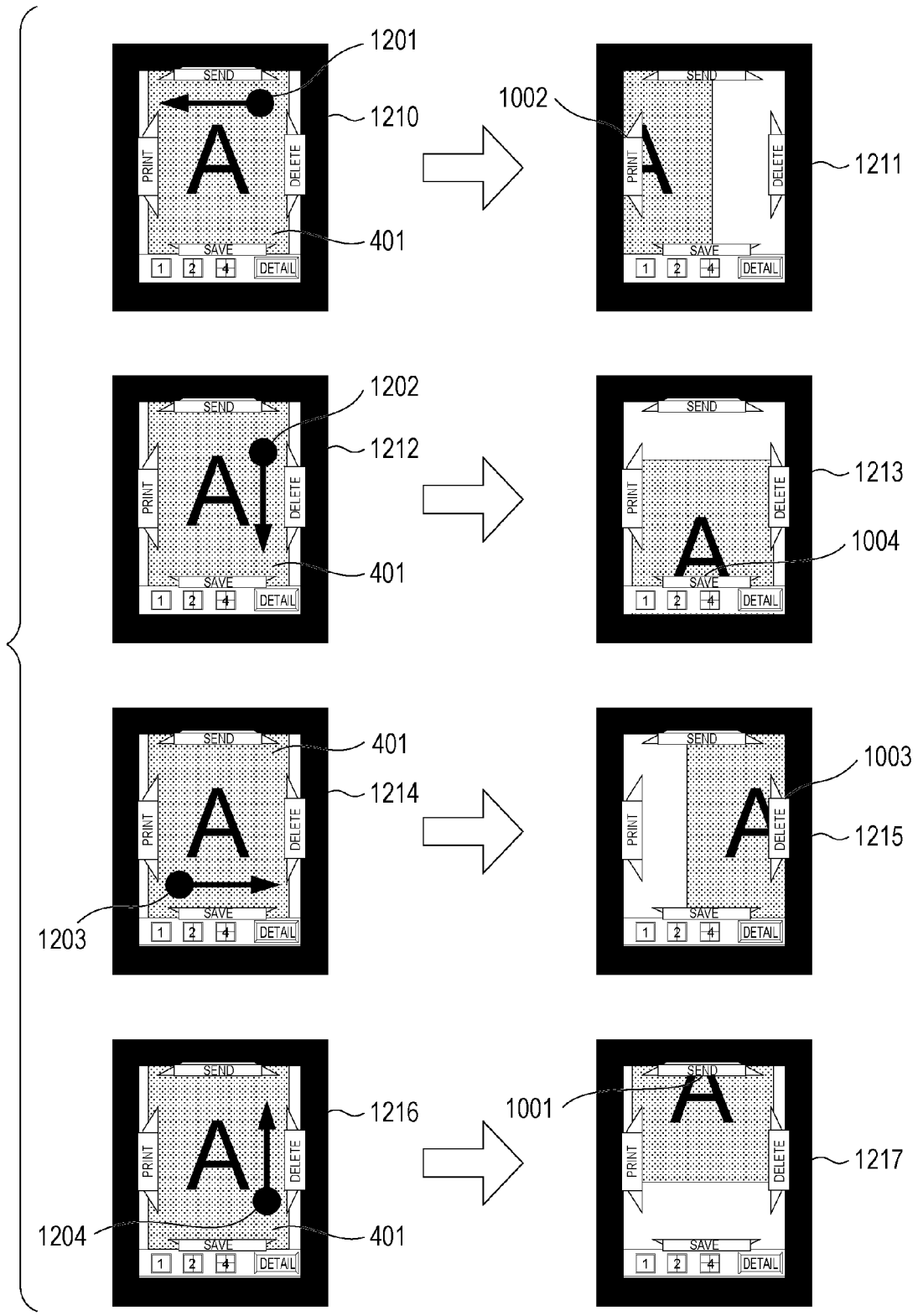
FIG. 12 illustrates a display example of the operation panel according to the present exemplary embodiment.

FIG. 12 illustrates respective screen examples when the user conducts the flick operation in the up, down, left, and right directions in a state in which the operation panel 3000 is set to be vertical. FIG. 12 corresponds to FIGS. 4 and 10, and the same components are assigned with the same reference signs.

In a state 1210, as represented by a gesture 1201, the user touches the document data 401 on the input display panel 3000 and flicks the finger from the user's right towards the left. By the gesture 1201, as illustrated in a state 1211, the display is updated in a manner that the document data 401 flows from the right towards the left direction. Subsequently, the print processing indicated by the operation guide 1002 is carried out.

In a state 1212, as represented by a gesture 1202, the user touches the document data on the input display panel 3000 and flicks the finger from the top towards the bottom. By the gesture 1202, as illustrated in a state 1213, the display is updated in a manner that the document data 401 flows from the top towards the bottom direction. Subsequently, the save processing indicated by the operation guide 1004 is carried out.

In a state 1214, as represented by a gesture 1203, the user touches the document data on the input display panel 3000 and flicks the finger from the user's left towards the right. By the gesture 1203, as illustrated in a state 1215, the display is updated in a manner that the document data 401 flows from the left towards the right direction. Subsequently, the deletion processing indicated by the operation guide 1003 is carried out.

In a state 1216, as represented by a gesture 1204, the user touches the document data on the input display panel 3000 and flicks the finger from the bottom towards the top. By the gesture 1204, as illustrated in a state 1217, the display is updated in a manner that the document data 401 flows from the bottom towards the top direction. Subsequently, the transmission processing indicated by the operation guide 1001 is carried out.

FIG. 3 will be described again. As described above, in S307, while following the table of FIG. 11, the gesture operation guides illustrated in FIG. 10 are displayed on the top, bottom, left, and right on the LCD 3200 of the operation panel 3000.

In S308, similarly as in S303, the CPU 3101 reads outputs of the touch panel 3300, the button device 3400, the three-dimensional acceleration sensor 3111, and the three-dimensional gyro sensor 3112 provided to its own device. A part of sensor values read here is stored in the RAM 3108. This is because instead of only using a single value that is output from the sensor, a displacement of the value is utilized. In S309, the CPU 3101 searches the table illustrated in FIG. 11 for the gesture that is input in the touch panel 3300.

In S310, the CPU 3101 determines whether or not the detected gesture is a gesture representing the print processing. That is, on the touch panel of the operation panel 3000, it is determined whether or not the flick operation towards the user's left direction facing the operation panel 3000 is detected. In a case where it is determined that the above-described gesture is detected, the flow proceeds to S314, and in a case where it is not determined that the gesture is detected, the flow proceeds to S311.

In S311, the CPU 3101 determines whether or not the detected gesture is a gesture representing the save processing. That is, on the touch panel of the operation panel 3000, it is determined whether or not the flick operation towards the bottom direction is detected. In a case where it is determined that the above-described gesture is detected, the flow proceeds to S314, and in a case where it is not determined that the gesture is detected, the flow proceeds to S312.

In S312, the CPU 3101 determines whether or not the detected gesture is a gesture representing the transmission processing. That is, on the touch panel of the operation panel 3000, it is determined whether or not the flick operation towards the top direction is detected. In a case where it is determined that the above-described gesture is detected, the flow proceeds to S314, and in a case where it is not determined that the gesture is detected, the flow proceeds to S313.

In S313, the CPU 3101 determines whether or not the detected gesture is a gesture representing the deletion processing. That is, on the touch panel of the operation panel 3000, it is determined whether or not the flick operation towards the user's right direction facing the operation panel 3000 is detected. In a case where it is determined that the above-described gesture is detected, the flow proceeds to S317, and in a case where it is not determined that the gesture is detected, the flow proceeds to S318.

In S314, the CPU 3101 determines whether or not a wireless communication between the operation panel 3000 and the main body 10000 is established. In a case where the wireless communication is not established, the flow proceeds to S315. The wireless communication is established, and the flow proceeds to S316.

In S316, the CPU 3101 sends the document data for instructing any one of the print, the save, and the transmission to the image forming apparatus main body 10000. At this time, in a case where the print processing is instructed, the transmission data sent herein includes the document data and a print instruction. The print instruction may include a previously set print setting as appropriate. The main body 10000 that has received the transmission data starts the print processing of the document data in accordance with the received print instruction while following the print setting.

Similarly, in a case where the save processing is instructed, the transmission data sent in S316 includes the document data and a save instruction. The save instruction includes information indicating a predetermined storage location in a storage unit (an HDD or the like) provided to the image forming apparatus main body 10000. The main body 10000 that has received the save instruction saves the document data in the specified storage location in accordance with the received save instruction. Also, in a case where the transmission processing is instructed, the transmission data sent in S316 includes the document data and a transmission instruction. The transmission instruction may include address information indicating a transmission destination as appropriate. The main body 10000 that has received the transmission instruction sends the document data to the specified transmission destination in accordance with the transmission instruction. For a protocol for the transmission, file transfer protocols such as an FTP, an SMB, and WebDAV may be used in addition to an electronic mail and a FAX. In a case where the print setting, the storage location, and the address information are not included in the transmission data sent in S316, values previously registered in the main body 10000 (default values) may be used.

In S317, the CPU 3101 deletes the document data from the RAM 3108 or the memory 3116 where the document data is stored. After that, the processing returns to S308. In S318, the CPU 3101 performs the corresponding processing on the basis of the other sensor values detected in S308. In S319, the CPU 3101 updates the display screen displayed on the LCD 3200 as appropriate while following the processing in S318, and the processing returns again to S308.

As described above, according to the processing of the present flow chart, by using the touch panel and the various sensors provided to the operation panel 3000, the operability for instructing the processing on the document data is further improved.

It is noted that the following modifications can be made for the processing of the above-described flow chart.

For example, in the above-described processing, the processing on the document data displayed on the operation panel is executed in units of the single document data composed of plural pages. Instead, the processing may be executed in units of the individual page. In a state 1210 of FIG. 12, in a case where the flick operation is conducted as represented by a state 1201, the document data is slid towards the left direction and displayed as represented by a state 1211. For example, in a case where the document data is document data composed of pages including "A", "B", "C", and "D", it is assumed that through this flick operation, up to "A" and "B" are slid in the left direction and displayed, and as a result, the slide stops at a point of displaying "C" of the third page. At this time, among the document data composed of the four pages, data on the two pages of "A" and "B" is sent to the main body 10000 as the transmission data. After that, the user similarly conducts the flick operation on the display of the "C" page again in the left direction, and in accordance with the slide of the two pages of "C" and "D" in the left direction, the data on these two pages is further sent to the main body 10000.

With this configuration, instructions in which a particular page of the document data composed of the plural pages is printed, another page is saved, and still another page is deleted can be simply issued by using the gestures on the touch panel.

Furthermore, in accordance with the number of fingers (or pens or the like) to be touched on the touch panel, the target of the processing may be switched between the units of the document or the units of the page. For example, in a case where the flick operation is conducted through a touch by one point, the instruction may be issued the units of the page, and the flick operation is conducted through touches by two points (two points are flicked in a same direction at the same time), the instruction may be issued the units of the document following the flow of FIG. 3. In this manner, the method for the gesture on the touch panel may have various variations.

Figure 13:
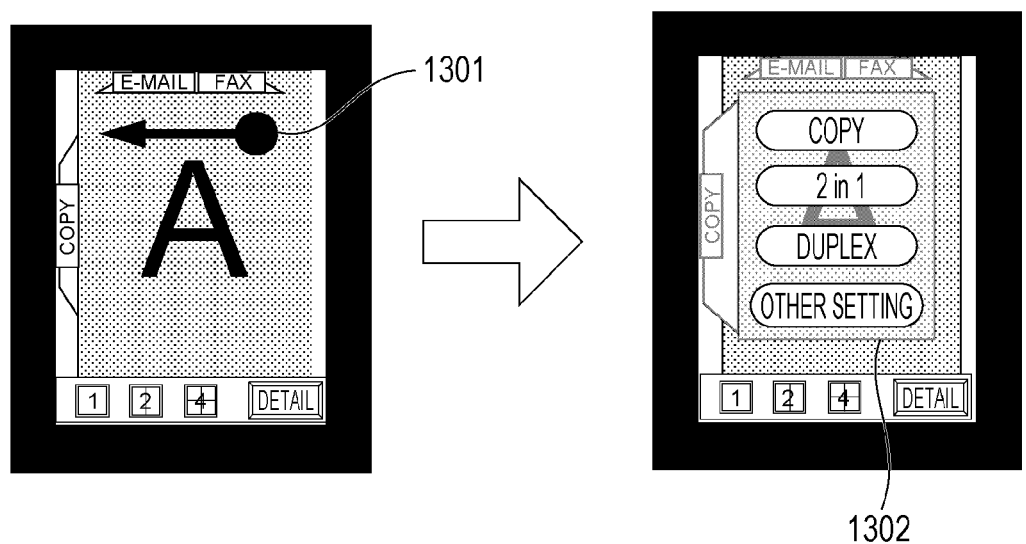
FIG. 13 illustrates a display example of the operation panel according to the present exemplary embodiment.

In addition, in the example of FIG. 3 described above, the processings indicated by the table of FIG. 11 include the four types including "print", "deletion", "save", and "transmission", but a processing other than the above may further be selected, and also instead of the above, a different processing may be executed. Also, as illustrated in FIG. 13, after the flick is conducted in the predetermined direction, a screen for inputting a detailed setting with respect to the predetermined processing allocated to the direction (the "copy processing" in FIG. 13) may be displayed. In the example of FIG. 13, in accordance with the conduction of the flick operation represented by a state 1301, a setting screen 1302 is displayed. When a button indicating a processing desired by the user is pressed on this setting screen, the processing is executed.

Also, in the above-described examples in FIGS. 8 and 9, as the method of switching the mode to the "transfer mode", the method of using the acceleration sensor and the gyro sensor has been described. Instead of this, the switching to the "transfer mode" may be instructed through another method such as a press of a switching button displayed on the LCD 3200 or a particular gesture input on the touch panel.

In addition, according to the above-described exemplary embodiment, the processing on the document data created and obtained by the operation panel 3000 is instructed. Instead of this, the document data stored in the HDD 14000 of the image forming apparatus main body 10000 may be displayed on the operation panel 3000, and a similar operation may be conducted on the document data. In this case, the transmission data sent from the operation panel 3000 to the main body 10000 in S316 does not include the document data.

As described above, according to the exemplary embodiment, the operability in the print instruction from the information processing apparatus provided with at least the touch panel to the print apparatus is further improved.

Other Embodiments

According to the above-described exemplary embodiment, the operation panel of the image forming apparatus has been described as the information processing apparatus as an example. In addition to the above, the information processing apparatus according to the exemplary embodiment of the present invention includes various apparatuses. For example, not only a personal computer, a PDA, and a mobile phone terminal but also a camera, a video camera, other image viewers, and the like are included.

Also, according to the above-described exemplary embodiment, the example in which the operation such as the flick is conducted by the finger has been described, but the embodiment can be realized by other instruction devices such as a stylus pen for inputting coordinates on the touch panel.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-272159, filed Dec. 13, 2011, which is hereby incorporated by reference herein in its entirety.

The invention claimed is:

1. An information processing apparatus provided with a touch panel comprising:
    a display unit configured to display document data;
    a detection unit configured to detect a flick operation on the touch panel;
    a storage unit configured to store a table for defining a processing that is to be executed on the document data displayed on the display unit, and is to be executed according to a flick operation towards a predetermined direction; and
    a control unit configured to perform control to execute a processing defined by the table stored in the storage unit, on the document data, according to the detection unit detecting the flick operation towards the predetermined direction while the document data is being displayed on the display unit,
    wherein the control unit transmits, according to the detection unit detecting the flick operation towards the predetermined direction while the document data stored in the information processing apparatus is being displayed on the display unit, the document data and an instruction to execute processing on the document data to a data processing apparatus, and transmits, according to the detection unit detecting the flick operation towards the predetermined direction while the document data stored in the data processing apparatus is being displayed on the display unit, the instruction to execute processing on the document data to the data processing apparatus without transmitting the document data to the data processing apparatus.

2. The information processing apparatus according to claim 1, further comprising a selection unit configured to select a first operation mode for browsing the document data or a second operation mode for instructing a processing on the document data,
    wherein in a case where the first operation mode is selected, the display unit displays another page included in the document data, according to the detection unit detecting the flick operation towards the predetermined direction.

3. The information processing apparatus according to claim 2,
    wherein in a case where the first operation mode is selected, the control unit performs control so as not to execute, on the document data, the processing defined by the table stored in the storage unit, according to the detection unit detecting the flick operation towards the predetermined direction, and in a case where the second operation mode is selected, the control unit performs control so as to execute, on the document data, the processing defined by the table stored in the storage unit, according to the detection unit detecting the flick operation towards the predetermined direction.

4. The information processing apparatus according to claim 1, wherein the display unit displays a guide indicating the processing defined by the table stored in the storage unit.

5. The information processing apparatus according to claim 1,
wherein the document data includes document data of a plurality of pages, and the control unit performs control so as to execute the processing defined by the table stored in the storage unit, on flicked pages among the plurality of pages, and performs control so as not to execute the processing defined by the table stored in the storage unit, on the remaining pages that are not flicked.

6. The information processing apparatus according to claim 1,
wherein the information processing apparatus is an operation panel of the data processing apparatus.

7. The information processing apparatus according to claim 1,
wherein another processing that is to be executed on the document data displayed on the display unit, and is to be executed according a flick operation towards a direction different from the predetermined direction, is defined in the table, and
wherein the control unit performs control to execute the another processing defined by the table stored in the storage unit, on the document data, according to the detection unit detecting the flick operation towards the direction different from the predetermined direction while the document data is being displayed on the display unit.

8. The information processing apparatus according to claim 1,
wherein in a case where a print processing is defined in the table as the processing to be executed according to the flick operation towards the predetermined direction, the control unit transmits a print instruction to a printing apparatus according to the detection unit detecting a flick operation towards the predetermined direction, and
wherein the document data is printed by the printing apparatus based on the print instruction transmitted by the control unit.

9. The information processing apparatus according to claim 1,
wherein in a case where a transmission processing is defined in the table as the processing to be executed according to the flick operation towards the predetermined direction, the control unit transmits a transmission instruction to a transmission apparatus according to the detection unit detecting the flick operation towards the predetermined direction, and
wherein the document data is transmitted by the transmission apparatus based on the transmission instruction transmitted by the control unit.

10. The information processing apparatus according to claim 1,
wherein the control unit performs control so as to slide the document data towards the predetermined direction according to the detection unit detecting the flick operation towards the predetermined direction while the document data is being displayed on the display unit.

11. The information processing apparatus according to claim 1, wherein a processing defined by the table is selectable.

12. A control method for an information processing apparatus provided with a touch panel, the method comprising:
performing a display control to cause a display unit to display document data;
detecting a flick operation on the touch panel;
storing a table for defining a processing that is to be executed on the document data displayed on the display unit, and is to be executed according to a flick operation towards a predetermined direction; and
performing control to execute a processing defined by the stored table, on the document data, according to detection of the flick operation towards the predetermined direction while the document data is being displayed on the display unit,
wherein the performing control transmits, according to detection of the flick operation towards the predetermined direction while the document data stored in the information processing apparatus is being displayed on the display unit, the document data and an instruction to execute processing on the document data to a data processing apparatus, and transmits, according to detection of the flick operation towards the predetermined direction while the document data stored in the data processing apparatus is being displayed on the display unit, the instruction to execute processing on the document data to the data processing apparatus without transmitting the document data to the data processing apparatus.

13. A non-transitory computer readable medium storing a program for causing a computer provided with a touch panel to execute a processing comprising:
performing a display control to cause a display unit to display document data;
detecting a flick operation on the touch panel;
storing a table for defining a processing that is to be executed on the document data displayed on the display unit, and is to be executed according to a flick operation towards a predetermined direction; and
performing control to execute a processing defined by the stored table, on the document data, according to detection of the flick operation towards the predetermined direction while the document data is being displayed on the display unit,
wherein the performing control transmits, according to detection of the flick operation towards the predetermined direction while the document data stored in the information processing apparatus is being displayed on the display unit, the document data and an instruction to execute processing on the document data to a data processing apparatus, and transmits, according to detection of the flick operation towards the predetermined direction while the document data stored in the data processing apparatus is being displayed on the display unit, the instruction to execute processing on the document data to the data processing apparatus without transmitting the document data to the data processing apparatus.

14. An information processing apparatus provided with a touch panel comprising:
a display unit configured to display document data;
a detection unit configured to detect a flick operation on the touch panel; and
a transmission unit configured to transmit, according to the detection unit detecting the flick operation towards a predetermined direction while the document data stored in the information processing apparatus is being displayed on the display unit, the document data and an instruction to execute processing on the document data to a data processing apparatus, and transmit, according to the detection unit detecting the flick operation towards the predetermined direction while the document data stored in the data processing apparatus is being displayed on the display unit, the instruction to execute processing on the document data to the data processing apparatus without transmitting the document data to the data processing apparatus.

15. A control method for an information processing apparatus provided with a touch panel, the method comprising:
    performing a display control to cause a display unit to display document data;
    detecting a flick operation on the touch panel; and
    transmitting, according to detection of the flick operation towards a predetermined direction while the document data stored in the information processing apparatus is being displayed on the display unit, the document data and an instruction to execute processing on the document data to a data processing apparatus, and transmitting, according to the detection of the flick operation towards the predetermined direction while the document data stored in the data processing apparatus is being displayed on the display unit, the instruction to execute processing on the document data to the data processing apparatus without transmitting the document data to the data processing apparatus.

16. A non-transitory computer readable medium storing a program for causing a computer provided with a touch panel to execute processing comprising:
    performing a display control to cause a display unit to display document data;
    detecting a flick operation on the touch panel; and
    transmitting, according to detection of the flick operation towards a predetermined direction while the document data stored in the information processing apparatus is being displayed on the display unit, the document data and an instruction to execute processing on the document data to a data processing apparatus, and transmitting, according to the detection of the flick operation towards the predetermined direction while the document data stored in the data processing apparatus is being displayed on the display unit, the instruction to execute processing on the document data to the data processing apparatus without transmitting the document data to the data processing apparatus.

* * * * *